Dec. 24, 1968 F. A. DEUTER 3,418,264
SELF-INKING RUBBER
Filed Nov. 9, 1966

United States Patent Office 3,418,264
Patented Dec. 24, 1968

3,418,264
SELF-INKING RUBBER
Frederich A. Deuter, Hilton, South Australia, Australia, assignor of one-half to John Foundas, Mile End, South Australia, Australia
Filed Nov. 9, 1966, Ser. No. 593,017
Claims priority, application Australia, Nov. 16, 1965, 66,642/65
The portion of the term of the patent subsequent to July 18, 1984, has been disclaimed
12 Claims. (Cl. 260—23.7)

ABSTRACT OF THE DISCLOSURE

A self-inking rubber comprising in weight percent,

| | Weight percent |
|---|---|
| (a) Polyisoprene | About 20 to About 50 |
| (b) Sulphur | About 1 to About 10 |
| (c) A release agent consisting of a glycerol or glyceride type material | About 5 to About 25 |
| (d) A hygroscopic polymer of ethylene glycol | About 10 to About 30 |
| (e) A dye capable of release from the rubber when atmospheric moisture is absorbed by the hygroscopic polymer | About 5 to About 20 |
| (f) A filler including magnesium carbonate | About 5 to About 20 |

---

*Cross reference to related application.*—This application is a continuation-in-part of my copending U.S. application Ser. No. 273,462, filed Apr. 16, 1963, now United States Patent 3,331,794.

This invention relates to a rubber base material containing a dye or ink which may be released if the material is formed for example into a rubber stamp.

There are many uses for impression making materials, the most common probably being a rubber stamp, and according to previous inventions of mine a self-inking material suitable for a rubber stamp or for other uses contains a dye in a hygroscopic or deliquescent material so that the dye becomes released from the base rubber at a relatively slow rate enabling the rubber to be utilized as a rubber stamp over a long period of time. There are of course very many problems associated with obtaining a constant rate of release and also in obtaining a sharp impression, and one of the tendencies to be overcome is the tendency for the dye to release at a rapid rate early in the life of a stamp and at a very slow rate late in the life of a stamp, and one of the objects of this invention is to provide a material and a sequence of production of that material wherein the release rate will be more even and therefore a stamp more useful than in my previously proposed materials. Another problem which has been encountered has been the tendency for the rubber to become friable after polyethylene glycol has been added.

This invention may include as a feature the use of glycerol, glycerol monoricinoleate or some other glyceride, a polymer of ethylene glycol, a dye, a vulcanizing agent such as sulphur, and magnesium carbonate masticated into isoprene $CH_2:C(CH_3)CH:CH_2$.

Figure 1:
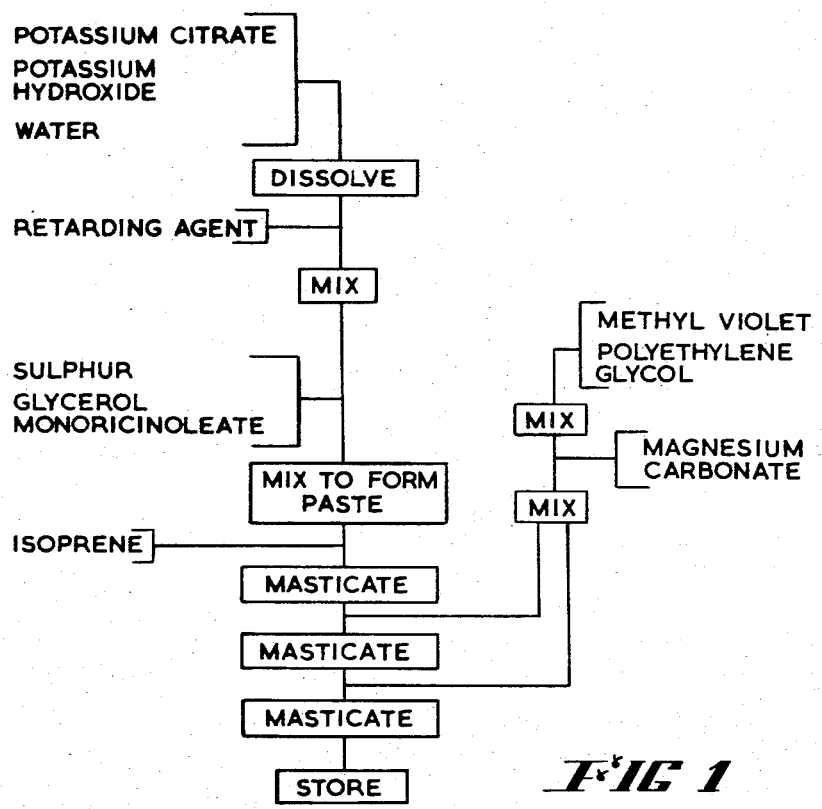
Figure 2:
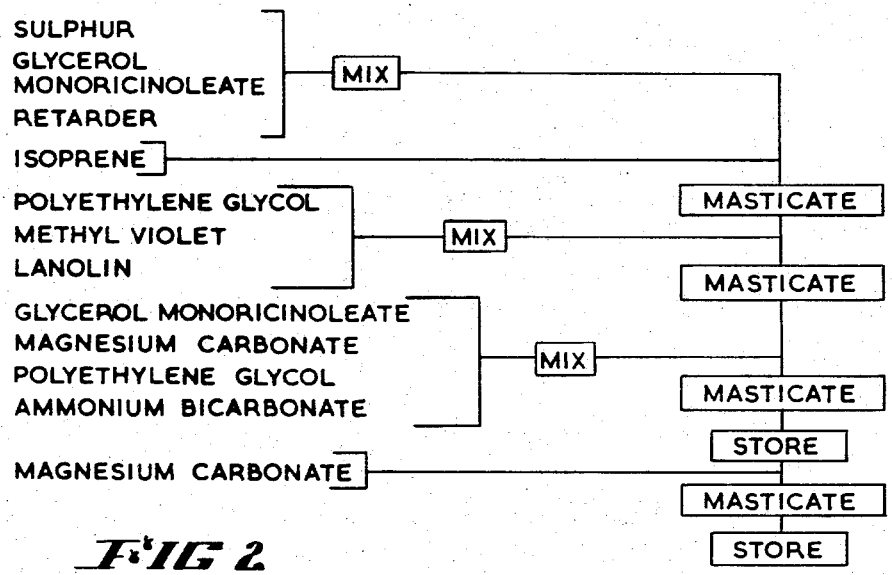

Two embodiments are described hereunder in some detail with reference to the accompanying drawings, in which:

FIG. 1 is a block diagram illustrating diagrammatically the constituents and sequence of mixing to form a self-inking rubber according to a first embodiment, and FIG. 2 is a block diagram similarly illustrating a second embodiment.

Referring firstly to the embodiment of FIG. 1 the first stage of production of a self-inking material is to dissolve 0.6 gram of potassium citrate and 0.05 gram of potassium hydroxide in 0.65 cc. of distilled water. 0.2 gram of retarding agent ("Curetard" by Monsanto, being polymer N-nitroso-2:2:4 trimethyl 1:2 dihydro quinoline) are then mixed in thoroughly with the solution, and after this has been done 1.2 grams of sulphur are added and 2.5 cc. of glycerol monoricinoleate. This is mixed thoroughly to form a paste.

The function of the potassium citrate is to eventually form a deliquescent constituent within the self-inking material and to improve penetration of the ink when the stamp is applied to paper, this assisting in causing the ink to "take" to the paper. Potassium hydroxide facilitates making a sharper impression, and is hygroscopic so that it assists in absorption of moisture from the air. If less than about 0.5 cc. of water are used the rubber tends to become friable because the potassium citrate and polyethylene glycol impairs cohesion, while more than about 0.7 cc. of water will tend to make the rubber "over wet." Sulphur is added as a vulcanizing agent and the glycerol monoricinoleate makes an emulsion with the dye mixture of polyethylene glycol and methyl violet. It may be noted that glycerol monoricinoleate tends to retain a five percent dispersion with water. The addition of the retarding agent prevents precuring after the material is packed and before it is moulded to the desired shape, and secondly affects the rubber in having a bonding or plasticizing effect.

A second mixture is then made by mixing 2.2 grams of methyl violet with 7.8 cc. of polyethylene glycol 200 and this is thoroughly mixed. 5.0 grams of magnesium carbonate (Levis) are then added and thoroughly mixed to form a uniform paste.

Separately 15 grams of isoprene 307

$$(CH_2:C(CH_3)CH:CH_2$$

in this embodiment being "Cariflex," a trademark applied by the Shell Company) are masticated with 5 grams of the first mixture, and after this has taken place, are then masticated with 15 grams of the second mixture. When the first mixture has been thoroughly masticated into the isoprene, the second mixture is added as quickly as possible, and as soon as possible after having been masticated the material is enclosed in a polyethylene or some other air tight container so as to exclude absorption of moisture from the air which might otherwise interfere with the even vulcanizing of a moulded stamp.

The function of the polyethylene glycol 200 is firstly to give hygroscopic properties to the material and secondly to assist the release of dye from its loose chemical combination with the rubber compounds. The function of the magnesium carbonate which should be light or of Levis grade is to function as a dispersing agent giving "body" to the dye mix and improving mastication, use being made of the adsorptive properties of this material. The reason that "Cariflex" IR 307 has been chosen for the synthetic rubber is that it is known to be a pure grade, and it should be noted that the presence of impurities may interfere with the efficiency of the material. For example dextrin present in small quantities would interfere with the formation of the ink and with its flow.

The material according to this invention is suitable for the forming of a rubber stamp preferably matrix moulded to prevent possible moisture absorption.

It is desirable that the sequence set out above should be followed and the mixture of potassium citrate and potassium hydroxide solution with the retarding agent assists in preventing clogging of the mixture when the sulphur and monoricinoleate are added.

Magnesium carbonate may be incorporated in the first mixture, less being used in the second mixture. Different dyes may be used for different colours, for example:

Blue—methylene blue or victoria blue BN150 supplied by I.C.I.

Red—magenta (Fuchsin), either alone or together with Rhodamine B.

The following table indicates the percentage by weight of the constituents of the above embodiment and the permissible range of variation which has been determined empirically:

|  | Percent |
| --- | --- |
| Isoprene | 42.4 (range 20 to 50) |
| Potassium citrate | 1.8 (range 1 to 3) |
| Retarder | 0.6 (range 0.2 to 1) |
| Potassium hydroxide | 0.14 (range 0.1 to 1) |
| Water | 1.8 (range 0 to 3) |
| Sulphur | 3.3 (range 1 to 10) |
| Glycerol monoricinoleate | 7.1 (range 5 to 25) |
| Methyl violet | 6.3 (range 5 to 20) |
| Polyethylene glycol | 22.3 (range 10 to 30) |
| Magnesium carbonate | 14.26 (range 5 to 20) |

It is desirable to "load" the isoprene with as much usable dye mix as possible and it is found that by decreasing or eliminating the potassium salts, the percentage of isoprene can be reduced and the percentage of dye increased. However, some difficulties are encountered in the mixing and in the second embodiment described hereunder, a sequence of mixing is set forth which will enable a satisfactory self-inking material to be produced.

According to the second embodiment (illustrated in FIG. 2) three mixtures are made. The first of the three mixtures consists of 1.5 grams of sulphur and 1.5 grams of glycerol monoricinoleate; the second mixture consists of 5 cc. of polyethylene glycol (200) and 5 grams of methyl violet (methyl rosaniline chloride); while the third mixture consists of 8 cc. of polyethylene glycol (200), 12 grams glycerol monoricinoleate and 6 grams of magnesium carbonate (Levis).

Each mix is separately, thoroughly mixed to a homogeneous consistency. 15 grams of isoprene then have 3 grams of the first mixture thoroughly masticated into it, and after this mastication is finished the second mix is masticated into the isoprene and first mix, and when this second mastication is finished, a third mastication takes place with the third mix added. The masticated material is then stored in a polyethylene bag or other air tight container for two days and then masticated with a further 3 grams of magnesium carbonate (Levis).

A small amount of retarder ("Curetard," as above) may be used in mix 1, if desired, to assist mastication and prevent precuring. A very small amount of ammonium bicarbonate may be used in mix 2 or 3 also for the same purpose. A very small amount of lanolin may also be used in mix 2 to assist mastication.

The material is stored out of contact with air, and to form a moulded article (e.g. a rubber stamp) the material can be moulded by vulcanizing out of contact with air, at a temperature of 300° F. for at least 15 minutes. Again different colours can be obtained by utilizing different aniline dyes as disclosed in the first embodiment.

The quantities and range of possible quantities according to this embodiment are set out hereunder:

|  | Percent |
| --- | --- |
| Isoprene | 26 (range 20–50) |
| Sulphur | 2 (range 1–10) |
| Glycerol monoricinoleate | 24 (range 5–30) |
| Polyethylene glycol | 23 (range 10–30) |
| Methyl violet | 9 (range 5–20) |
| Magnesium carbonate | 16 (range 5–20) |

A glyceride is generally preferred to glycerol as a release agent, for the reason that it functions with the polyethylene glycol to form an ink which dries quickly upon application to paper for example, and the polyethylene glycol loosely combines with moisture from the atmosphere and dye to make the ink a suitable and substantially permanent substance when applied to paper or the like. Of all the glycerides which has been tried empirically glycerol monoricinoleate has been found to be the most satisfactory, although further glycerides (glycerol mono oleate, glycerol mono stearate and the like) appear to function with varying degrees of success.

The grade of polymer of ethylene glycol which has proved to be most suitable is polyethylene glycol 200, although other grades (e.g. 300 and 400) will function, but again with varying degrees of success. However, the higher grades such as polyethylene glycol 1,000 are not suitable.

Magnesium carbonate is selected from a wide range of filler materials which may also include barium sulphate and kieselguhr, the magnesium carbonate, however, being preferred since it does not toughen the rubber as much as, for example, barium sulphate. However, a mixture of filler materials may be employed with little influence on the final product.

There are a vast number of dyes which are available, and the tests which have been conducted indicate that many of the aniline dyes are suitable. However, other dyes (e.g. rhodamine B, Victoria blue) may be used satisfactorily. There appears to be no governing criterion and the only method of determining whether a dye is suitable is empirical.

What I claim is:

1. A self-inking rubber comprising:

|  | Percent by weight |
| --- | --- |
| Polyisoprene | 20 to 50 |
| Retarder | 0.2 to 1.0 |
| Sulphur | 1 to 10 |
| Glycerol monoricinoleate | 5 to 25 |
| Polyethylene glycol | 10 to 30 |
| Aniline dye | 5 to 20 |
| Magnesium carbonate (Levis) | 5 to 20 |

2. A self-inking rubber according to claim 1 further comprising:

|  | Percent by weight |
| --- | --- |
| Potassium citrate | 1 to 3 |
| Potassium hydroxide | 0.1 to 1 |

3. A self-inking rubber according to claim 1 further comprising less than 1% by weight of each of lanolin and ammonium bicarbonate.

4. A self-inking rubber comprising:

|  | Percent by weight (approx.) |
| --- | --- |
| Polyisoprene | 43 |
| Potassium citrate | 1.8 |
| Retarder | 0.6 |
| Potassium hydroxide | 0.14 |
| Water | 1.8 |
| Sulphur | 3.3 |
| Glycerol monoricinoleate | 7.1 |
| Methyl Violet | 6.3 |
| Polyethylene glycol | 22.3 |
| Magnesium carbonate | 14.26 |

5. A self-inking rubber comprising in weight percent,

| | Weight percent |
|---|---|
| (a) polyisoprene | about 20 to about 50 |
| (b) sulphur | about 1 to about 10 |
| (c) a release agent consisting of a glycerol or glyceride type material | about 5 to about 25 |
| (d) a hygroscopic polymer of ethylene glycol | about 10 to about 30 |
| (e) a dye capable of release from the rubber when atmospheric moisture is absorbed by the hygroscopic polymer | about 5 to about 20 |
| (f) a filler including magnesium carbonate | about 5 to about 20 |

6. A self-inking rubber according to claim 5 wherein said release agent consists of glycerol monoricinoleate.

7. A self-inking rubber according to claim 5 wherein the hygroscopic polymer of ethylene glycol consists of polyethylene glycol.

8. A self-inking rubber according to claim 7 wherein the dye comprises methyl violet.

9. A self-inking rubber according to claim 7 wherein the dye comprises magenta (fuschin).

10. A self-inking rubber according to claim 7 wherein the dye comprises rhodamine B.

11. A self-inking rubber according to claim 7 wherein the dye comprises Victoria blue.

12. A self-inking rubber according to claim 7 further comprising a retarder.

References Cited

UNITED STATES PATENTS 3,331,794   7/1967   Deuter _____ 260—5

OTHER REFERENCES

"Carbowax," Union Carbide Chemicals Co., 1960.

MORRIS LIEBMAN, *Primary Examiner.*

S. L. FOX, *Assistant Examiner.*

U.S. Cl. X.R.

260—41.5